(12) United States Patent
Vazzana et al.

(10) Patent No.: US 10,619,747 B2
(45) Date of Patent: Apr. 14, 2020

(54) EXPANDING GATE VALVE ASSEMBLY WITH PRESSURE EQUALIZATION SYSTEM

(71) Applicant: Hydra-Stop LLC, Burr Ridge, IL (US)

(72) Inventors: Christopher C. Vazzana, Palos Park, IL (US); Carl Mastny, Crete, IL (US); Andrew J. Nelson, Chicago, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 128 days.

(21) Appl. No.: 15/848,158

(22) Filed: Dec. 20, 2017

(65) Prior Publication Data

US 2019/0186640 A1  Jun. 20, 2019

(51) Int. Cl.
| | |
|---|---|
| *F16K 3/30* | (2006.01) |
| *F16L 55/105* | (2006.01) |
| *F16L 55/124* | (2006.01) |
| *F16K 3/28* | (2006.01) |
| *F16L 41/06* | (2006.01) |

(52) U.S. Cl.
CPC .............. *F16K 3/30* (2013.01); *F16L 55/105* (2013.01); *F16L 55/124* (2013.01); *F16K 3/28* (2013.01); *F16L 41/06* (2013.01)

(58) Field of Classification Search
CPC ......... F16K 3/30; F16L 55/124; F16L 55/105; Y10T 137/613
USPC ............................... 251/171, 172; 138/93, 94
See application file for complete search history.

(56) References Cited

U.S. PATENT DOCUMENTS

| | | | | |
|---|---|---|---|---|
| 1,352,735 | A * | 9/1920 | Egerton | F16K 1/46 251/358 |
| 3,905,576 | A * | 9/1975 | Fox, Jr. | F16K 3/0245 251/327 |
| 5,186,199 | A * | 2/1993 | Murphy | F16K 7/20 137/15.08 |
| 6,810,903 | B1 * | 11/2004 | Murphy | F16L 55/105 137/315.41 |
| 8,627,843 | B2 | 1/2014 | Ries | |
| 9,644,779 | B2 | 5/2017 | Vazzana et al. | |

(Continued)

OTHER PUBLICATIONS

United Kingdom Search Report for related Application No. GB1817250.2; report dated Apr. 3, 2019.

*Primary Examiner* — Eric Keasel
*Assistant Examiner* — Kevin R Barss
(74) *Attorney, Agent, or Firm* — Miller, Matthias & Hull LLP (57) ABSTRACT

A gate valve for a pressurized pipe includes a paddle member with a lower proximal portion and a pair of spaced-apart and leg portions that form an outer edge and an inner edge. A cartridge includes a valve stem channel extending through a distal portion and through a conduit and terminating at a proximal opening in a proximal portion of the cartridge. The proximal portion of the cartridge includes a slot for accommodating the inner edge of the paddle member. In a pre-compression configuration, the inner edge of the paddle member is spaced-apart from the proximal opening of the conduit and in a post-compression configuration, the inner edge of the paddle member engages and seals the proximal opening resulting in a built-in check-valve that is open when the paddle member is in the pre-compression configuration and closed when the paddle member is in the post-compression configuration.

17 Claims, 3 Drawing Sheets

(56) References Cited

U.S. PATENT DOCUMENTS

2009/0224197 A1* 9/2009 Nakano .................. F16K 3/186
251/326
2012/0161055 A1* 6/2012 Nakamura ............ F16K 1/2085
251/329
2013/0319542 A1* 12/2013 Ries ...................... F16L 55/105
137/15.23

* cited by examiner

EXPANDING GATE VALVE ASSEMBLY WITH PRESSURE EQUALIZATION SYSTEM

BACKGROUND

Technical Field

This disclosure relates generally to valves for shutting off flow in a pressurized pipe or conduit. More specifically, this disclosure relates to gate valves that are installable on a pressurized pipe without shutting off flow through the pipe during installation. Still more specifically, this disclosure relates to improvements in the designs of such gate valves, including a mechanism for equalizing the pressure above the gate valve and within the gate valve housing to that of the pressurized pipe during operation of the gate valve assembly.

Description of the Related Art

Pressurized conduits or pipes convey fluids, both liquid and gas, in municipalities, industrial plants and commercial installations. When originally installed, a network of pipes may include isolation valves used to isolate certain sections of the pipe for repairs, relocation, installation of new components into the pipe, etc. However, a shutdown closing one or more isolation valves of part of a municipal water system or other fluid distribution system may deprive a large area of water service resulting in inconvenience to residents, schools, hospitals, commercial and/or industrial facilities.

The length of pipe of a water system that needs to be isolated can be shortened and fewer people inconvenienced by adding additional valves, in conjunction with the preexisting block valves. Currently, installation of additional valves on a pressurized pipe does not require service interruption and results in minimal fluid or pressure loss. The additional valves connect to the pipe as an assembly with a nozzle and/or installation housing. After removal of the installation housing, the nozzle accommodates the valve in an open position. Upon closure of the added valve and completion of the work on the depressurized damaged section of the pipe, an operator opens the additional valve retracting it back into the nozzle thereby restoring flow through the repaired section of pipe. The additional valves are known as insertion valves, add-on valves, insertable gate valves, etc. Exemplary gate valves are disclosed in commonly assigned U.S. Pat. Nos. 6,810,903, 8,627,843 and 9,644,779. An advantage provided by the systems of the '903, '843 and '779 patents is that only a portion of the cross-section of the pipe is removed to install the valve. As a result, the integrity of the pipe section is maintained. In contrast, installation of many standard valves requires an entire section of pipe to be removed and replaced with a new section that includes the added valve.

Returning to systems like those shown in the '903, '843 and '779 patents, the nozzle is clamped perpendicularly and pressure-tight to the outside of the pipe by a saddle assembly as shown in FIGS. 1 and 15 of the '903 patent. An installation housing is typically mounted on top of the nozzle with a temporary valve disposed therebetween as shown in FIGS. 1 of the '903 patent and FIGS. 2-7 of the '843 and '779 patents. A process known as pressure tapping, hot tapping or under-pressure tapping forms an opening in the pipe thereby establishing communication between the nozzle and the pipe. This process is well known in prior art, and utilizes the temporary valve to allow a cutting device to pass from the installation housing and through the temporary valve and nozzle before cutting a hole in the pipe without significant loss of fluid pressure, which is contained by the installation housing. After cutting the opening in the pipe, a feed screw moves the additional gate valve from the installation housing, through the temporary valve and into the nozzle, where it may be sealably set in place. See FIGS. 3, 19 and 21-22 of the '903 patent, FIG. 10 of the '843 patent and FIG. 8 of the '779 patent. After removal of the installation housing and the temporary gate, the nozzle may be equipped with a cover plate having an opening for the gate stem. An accommodating operating nut is fixedly attached to the gate stem so the nozzle, gate valve and saddle assembly may form a permanent installation on the pressurized pipe. An operator may open and close the gate valve by turning the operating nut with a handle or wrench.

As shown in FIGS. 10-14 of the '903 patent, FIG. 12 of the '843 patent and FIG. 9 of the '779 patent, the gate valve forms a seal directly on the inside surface of the host pipe. The problem with sealing on the inside face of any pipe is that the condition and internal diameter of the pipe can vary so the sealing element must be able to expand to cover a range of internal pipe conditions and diameters. As a result, there is a need for sealing elements that can expand radially to seal a variety of pipe internal diameters while enduring the enormous forces that come from high flow and high-pressure lines.

The sealing elements described in the '843 and '779 patents "generally U-shaped" "paddle(s)." The paddles are supported by structures known as a "cartridge" or a "bullet." As shown by the wiper seal 124 of FIG. 11 of the '843 patent and by the wiper seal 118 of FIG. 9 of the '779 patent, a sealed pressure zone is created above the wiper seals 124, 118 and within the nozzles 50 when the wiper seals 124, 118 begin interacting with the interior nozzle surface upon closing the gate valves. This sealed, pressurized zone of incompressible fluid (i.e., water) will prohibit upward vertical movement of the gate valve to open the gate valve if a path is not made available for fluid above the gate valve to escape. As a result, there is a need for a pressure relief, which correlates to the vertical movement of the gate valve assembly.

Accordingly, needs exist for improved gate valve assemblies for installation in pressurized pipes and conduits that address these problems.

SUMMARY OF THE DISCLOSURE

A new gate valve assembly is disclosed for installation on/or in a pipe. The pipe has exterior and interior surfaces interrupted by a pipe gate opening cut into the pipe. The gate valve assembly includes a nozzle that includes a distal section (disposed outside the pipe) that connects to a proximal section (connected to the pipe). The proximal section of the nozzle connects to the pipe at the pipe gate opening in the pipe. The assembly also includes a paddle member that includes a lower proximal portion disposed between and connecting a pair spaced-apart leg portions. The leg portions and lower proximal portion of the paddle member form an outer edge that is generally U-shaped when the paddle member is in a pre-compression configuration and arcuate or rounded when the paddle member is in a post-compression configuration for engaging a portion of the interior surface of the pipe in alignment with the pipe gate opening in the pipe. The leg portions and the lower proximal portion of the paddle member also form an inner edge disposed opposite the outer edge of the paddle member. The assembly also includes a cartridge that includes a distal portion that remains disposed outside the pipe and that connects to a proximal portion that at least partially extends into the pipe. The cartridge further includes a valve stem channel extending from the distal portion of the cartridge to the proximal portion of the cartridge. The valve stem channel terminates at a proximal opening disposed in the proximal portion of the cartridge. The proximal portion of the cartridge also includes a slot for accommodating at least the inner edge of the paddle member. The slot extends around the valve stem channel and across the proximal opening. In a pre-compression configuration, a gap exists between the inner edge of the paddle member and the proximal opening and, in a post-compression configuration, the inner edge of the paddle member engages and seals the proximal opening while the outer edge of the paddle member engages and provides a seal against the interior surface of the pipe.

Another gate valve assembly is disclosed for installation on/or in a pipe and perpendicular to a central axis of the pipe. The pipe has an exterior surface and interior surface that extends circumferentially about the central axis of the pipe, except at a pipe gate opening in the pipe that extends through the exterior and interior surfaces of the pipe. The pipe gate opening has a central axis that is perpendicular to the central axis of the pipe. The gate valve assembly includes a nozzle that includes a distal section (disposed outside the pipe) connected to a proximal section that is perpendicularly connected to the pipe at the pipe gate opening in the pipe. The distal and proximal sections of the nozzle have a common central axis that is a co-linear with the central axis of the opening of the pipe. The gate valve assembly also includes a paddle member that includes a lower proximal portion disposed between and connected to a pair of spaced-apart and generally parallel leg portions. The leg portions and lower proximal portion of the paddle member form an outer edge that is generally U-shaped when the paddle member is in a pre-compression configuration and arcuate or rounded when the paddle member is in a post-compression configuration. In the post-compression configuration, the paddle member engages a portion of the interior surface of the pipe that extends about the central axis of the pipe and that is in coplanar alignment with the central axis of the opening in the pipe and the common central axis of the nozzle. The leg portions and lower proximal portion of the paddle member also form an inner edge that is disposed opposite the outer edge of the paddle member. The gate valve assembly also includes a cartridge that includes a distal portion and a proximal portion. The cartridge includes a valve stem channel that extends from the distal portion to the proximal portion of the cartridge and that terminates at a proximal opening disposed in the proximal portion of the cartridge. The proximal portion of the cartridge also includes a slot for accommodating at least the inner edge of the paddle member. The slot extends around and across the proximal opening. In the pre-compression configuration, inner edge of the paddle member is spaced-apart from the proximal opening. And, in the post-compression configuration, the inner edge of the paddle member engages and seals the proximal opening while the outer edge of the paddle member engages and provides a seal against the portion of the inner surface of the pipe that extends to about the central axis of the pipe and in coplanar alignment with the central axis of the opening in the pipe and the common central axis of the nozzle.

A new paddle member serves as a primary sealing element of a gate valve that is extendable into a pressurized pipe for shutting off flow through the pipe and that is retractable from the pipe to reestablish flow through the pipe. The paddle member includes a lower proximal portion disposed between and connected to a pair of spaced-apart and generally parallel leg portions. The paddle member includes a plurality of molded and alternating rubber and fabric layers, wherein the fabric layers are encapsulated within the rubber layers to prevent exposure of the fabric layers to fluid. Each fabric layer includes through holes through which rubber extends to connect one rubber layer to at least one other rubber layer during molding to secure the fabric layers between the rubber layers. In an embodiment, each leg of the paddle member includes a recess disposed along an inner edge thereof. The recesses provide weak areas in the legs, which promote outward buckling/cold flow of the legs when the paddle member is compressed. As a result, when the lower proximal portion of the paddle member is pressed against the bottom of the pipe, the legs move outwardly to engage the interior surface of a pipe.

A gate valve for pressurized pipe includes a paddle member that includes a lower proximal portion disposed between and connected to a pair of spaced-apart leg portions. The leg portions and the lower proximal portion of the paddle member form an outer edge. The leg portions and lower proximal portion of the paddle member also form an inner edge disposed opposite the outer edge. The gate valve further includes a cartridge that includes a distal portion connected to a proximal portion. The cartridge further includes a valve stem channel extending from the distal to the proximal portion of the cartridge before terminating at a proximal opening in the proximal portion of the cartridge. The proximal portion of the cartridge also includes a slot for accommodating at least the inner edge of the paddle member. In a pre-compression configuration, the inner edge of the paddle member is spaced-apart from the proximal opening of the valve stem channel. In a post-compression configuration, the inner edge of the paddle member engages and seals the proximal opening of the valve stem channel resulting in the inner edge of the paddle member and proximal opening forming a check-valve that is open when the paddle member is in the pre-compression configuration and closed when the paddle member is in the post-compression configuration.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

The drawings are not necessarily to scale and the disclosed embodiments may be illustrated diagrammatically and in partial views. In certain instances, details which are not necessary for an understanding of the disclosed methods and apparatuses or which render other details difficult to perceive may have been omitted. This disclosure is not limited to the particular embodiments illustrated herein.

DETAILED DESCRIPTION OF THE PRESENTLY PREFERRED EMBODIMENTS

Figure 1:
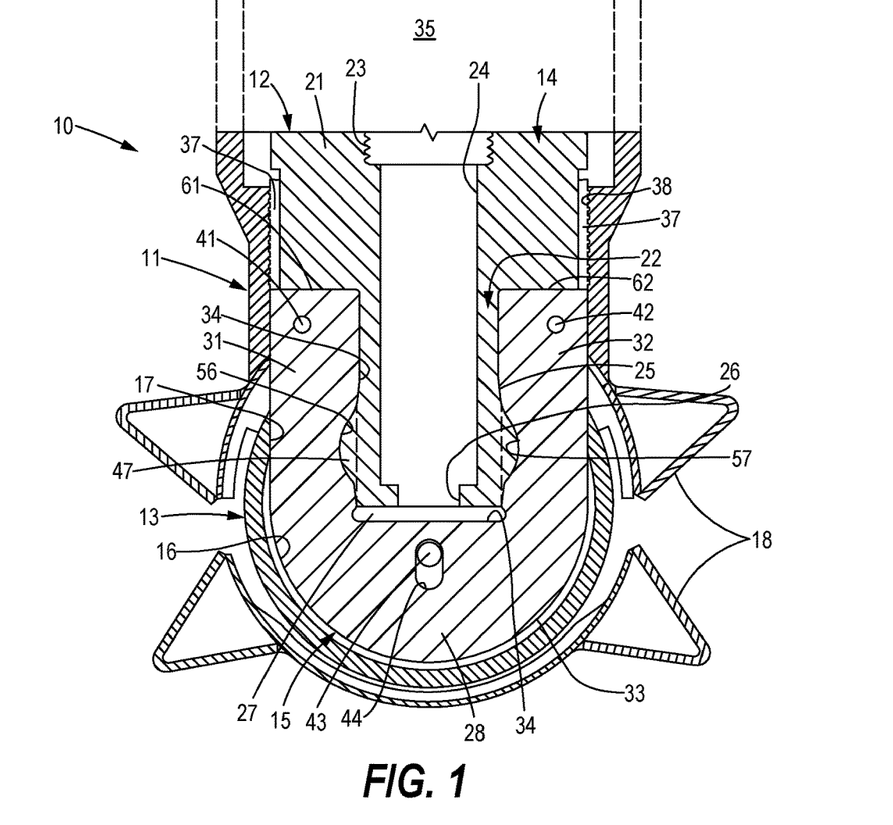
FIG. 1 is a sectional view of a disclosed gate valve assembly installed on a section of pipe wherein a paddle member of the gate valve is in a relaxed configuration, prior to full closure of the gate valve within the pipe (i.e., pre-compression configuration).
Figure 3:
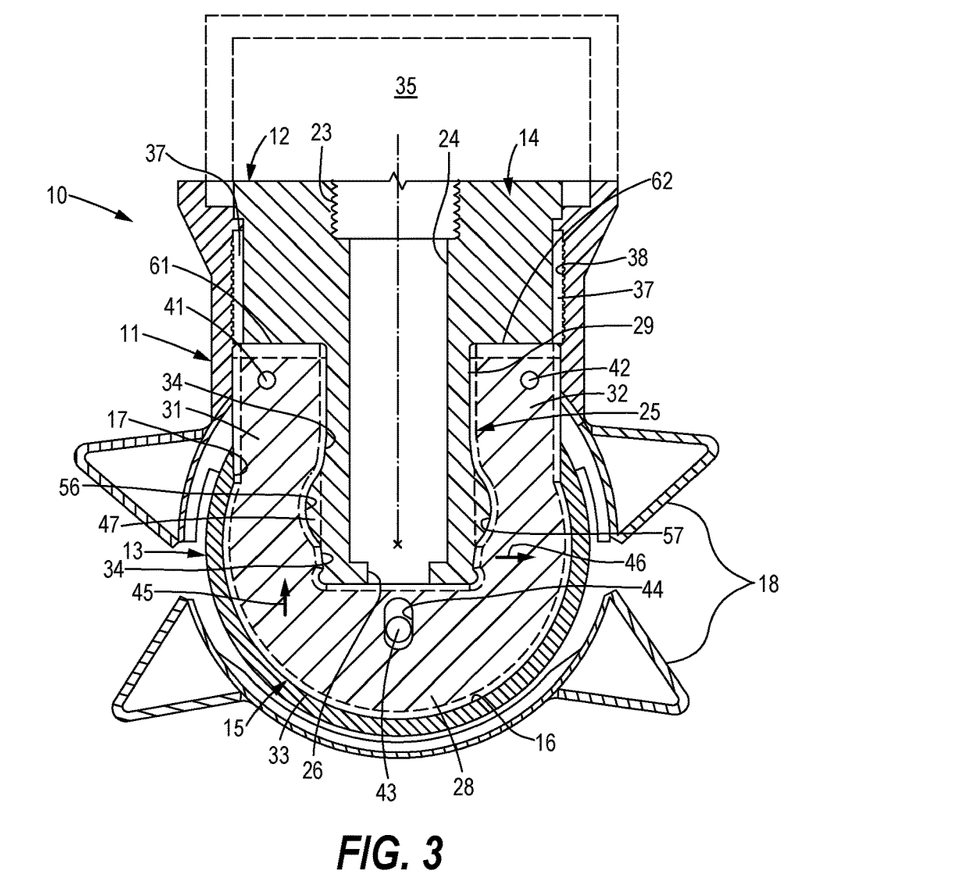
FIG. 3 is sectional view of the gate valve assembly and pipe as illustrated in FIG. 1, but wherein the cartridge is driven downward to compress a portion of the interior surface of the pipe (i.e., post-compression configuration).

Turning to FIG. 1, a partial view of the disclosed gate valve assembly 10 is shown with much of the distal portions of the nozzle 11 and cartridge 12 omitted for the sake of simplicity. In FIG. 1, the gate valve assembly 10 extends into a pipe 13, such as a water main, but the gate valve 14 has not been driven downward to achieve a compressed configuration of the paddle member 15 against the interior surface 16 of the pipe 13. FIG. 3 shows the compressed configuration as is discussed below. Returning to FIG. 1, the nozzle 11 of the gate valve assembly 10 connects to the pipe 13 at an pipe gate opening 17 cut into the pipe using a conventional method, such as pressure tapping, hot tapping or under pressure tapping. These techniques are known in the art. In the configuration illustrated in FIG. 1, the nozzle 11 clamps to the pipe 13 using a saddle assembly 18.

Figure 2:
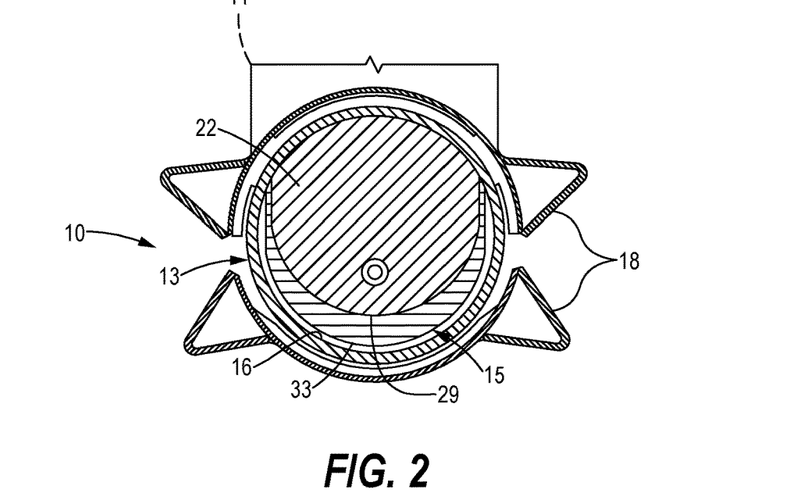
FIG. 2 is another sectional view of the pipe and gate valve assembly shown in FIG. 1, but providing a partial side view of the proximal portion of the cartridge of the gate valve and the paddle member wherein the paddle member is in an uncompressed or relaxed configuration (pre-compression configuration).

The gate valve 14 includes the cartridge 12 which includes a distal portion 21 and a proximal portion 22 (see FIG. 2), which is obscured in FIG. 1 by the paddle member 15. The distal portion 21 accommodates a valve stem nut 23 through which a valve stem channel 24 extends. The valve stem channel 24 extends from the distal portion 21 to the proximal portion 22 of the cartridge 12 before terminating at a proximal opening 26. As shown in FIGS. 1 and 3, the proximal portion 22 of the cartridge 12 and the valve stem channel 24 may form a conduit 25. In the pre-compression (relaxed) configuration or state of the paddle member 15 as shown in FIG. 1, a gap 27 exists between the proximal opening 26 and an inner edge 34 of the paddle member 15. As shown in FIG. 1, the lower proximal portion 28 of the paddle member 15 extends between and is connection to a pair of spaced-apart leg portions 31, 32. The leg portions 31, 32 and lower proximal portion 28 form an outer edge 33 along with the aforenoted inner edge 34. The outer edge 33 is generally U-shaped in the pre-compression configuration shown in FIG. 1 and is spaced-apart from the interior surface 16 of the pipe 13. As shown in FIGS. 1 and 3, the inner edge 34 of the paddle member 15 extends around the conduit 25 and across the proximal opening 26. However, in the pre-compression configuration shown in FIG. 1, fluid is free to communicate from the pipe 13 upward past the paddle member 15, through the gap 27, through the proximal opening 26 and upward through the valve stem channel 24/conduit 25. Water thus accumulates above the cartridge 12 and forms a sealed pressure zone 35 within the enclosed nozzle 11 or installation housing (not shown). As a result, to retract the gate valve 14 from the position shown in FIG. 1 upward into the nozzle 11, the water or fluid accumulated in the pressure zone 35 must be released as water and other Newtonian fluids are relatively incompressible. Therefore, with the paddle member 15 in the pre-compression configuration shown in FIG. 1, the proximal opening 26 is unsealed and water or fluid can drain downward through the valve stem channel 24 and proximal opening 26 before returning to the pipe 13 as the gate valve 14 is drawn upward. Thus, in the pre-compression configuration, the inner edge 34 of the paddle member 15, the proximal opening 26 and the conduit 25/valve stem channel 24 form an open check-valve thereby permitting fluid to drain from the zone 35 despite the sealing engagement between the 360° seal 37 against the inner surface 38 of the nozzle 11.

In contrast, in FIG. 3, the gate valve 14 has been driven downward pressing the outer edge 33 of the paddle member 15 against the interior surface 16 of the pipe 13, which is the post-compression configuration of the paddle member 15. This action has multiple effects. First, the outer edge 33 of the paddle member 15 engages and compresses against the interior surface 16 of the pipe 13 (post-compression configuration). Because the distal ends 61, 62 of the leg portions 31, 32 of the paddle member 15 are mounted to the cartridge 12 via pivot bolts 41, 42 and the lower proximal portion 28 of the paddle member is secured to the cartridge by the slot bolt 43 that is accommodated in elongated slot 44 in the lower proximal portion 28 of the paddle member 15, compression of the outer edge 33 against the bottom of the interior surface 16 of the pipe 13 causes the paddle member 15 to bias upward as indicated by the arrow 45 and outward as indicated by the arrow 46 of FIG. 3.

In one embodiment, recesses 56, 57 along the inner edge 34 of the paddle member 15 provide weak areas in the leg portions 31, 32. When the outer edge 33 of the lower proximal portion 28 of the paddle member 15 is pressed against the bottom of the pipe 13, the recesses 56, 57 promote outward buckling or cold flow of the leg portions 31, 32 from the straight/vertical pre-compression configuration of FIG. 1 to the arcuate post-compression configuration of FIG. 3. This conversion may be achieved without the protuberance 47 in the conduit 25 and, in such an embodiment, the conduit 25 is generally cylindrical as represented by the vertical phantom lines disposed on either side of the valve stem channel 24 as shown in FIGS. 1 and 3.

In another embodiment, also shown in FIGS. 1 and 3, the conduit 25 includes the radial protuberance 47. Referring to FIG. 3, as the outer edge 33 of the paddle member 15 at the lower proximal portion 28, the inner edge 34 of the paddle member 15 engages the protuberance 47 which causes the leg portions 31, 32 of the paddle member 15 to deflect and bulge outward to sealingly engage the interior surface 16 of the pipe 13. Thus, in the post-compression configuration shown in FIG. 3, the outer edge 33 of the paddle member 15 becomes arcuate and seals against the interior surface 16 of the pipe 13.

In both embodiments, the upward bias of the paddle member 15 because of the cartridge 12 being driven downward against the interior surface of the pipe 13 causes material from the leg portions 31, 32 of the paddle member 15 to buckle outwards against the interior surface 16 of the pipe 13. The first noted embodiment relies upon recesses 56, 57 to create weakened areas in the leg portions 31, 32 while the second noted embodiment utilizes the protuberance 47 to deflect or bias material of the leg portions 31, 32 outward against the interior surface 16 of the pipe 13. In either embodiment, the entire interior surface 16 of the pipe 13 (except at the pipe gate opening 17) receives a sealing engagement from the outer edge 33 of the paddle member 15 despite the fact the paddle member 15 has a more U-shaped configuration in the relaxed state or pre-compression configuration as shown in FIG. 1. Further, as shown in FIG. 3, the inner edge 34 of the paddle member 15 at the lower proximal portion 28 thereof engages the proximal opening 26 of the conduit 25/valve stem channel 24 causing the proximal opening 26 to be sealed. As a result. FIG. 3 shows the check-valve function of the gate valve 14 in the closed or in the post-compression configuration. The 360° seal 37 and the inner surface 38 of the nozzle 11 prevent any upward migration of water or fluid.

Figure 5:
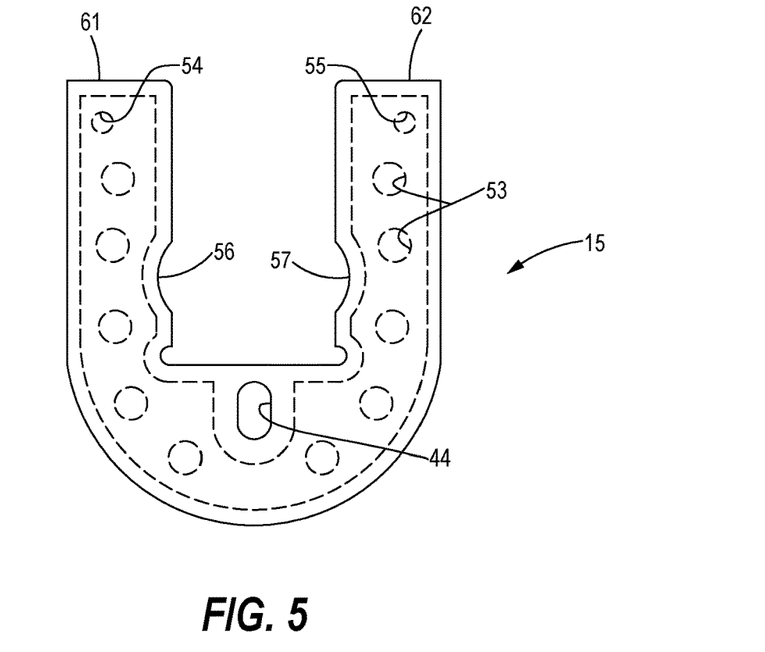
FIG. 5 is a plan view of a disclosed paddle member.
Figure 6:
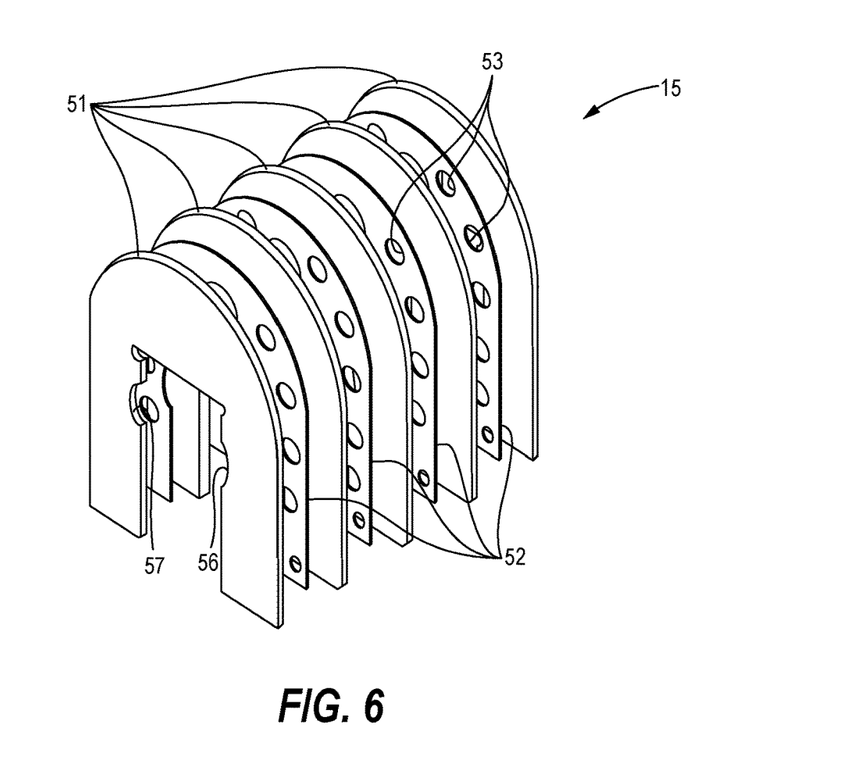
FIG. 6 is an exploded view of the paddle member shown in FIG. 5, particularly illustrating alternating rubber and fabric layers.

Turning to FIGS. 5-6, an improved paddle member 15 includes alternating structures that include rubber layer 51 with fabric layer 52 sandwiched between rubber layer 51. Preferably, the paddle member 15 is molded so that liquefied or partially liquefied rubber migrates through the openings 53 to allow the rubber layers 51 to bond together with the fabric layers 52 sandwiched therebetween. FIG. 5 shows the openings 54, 55 for accommodating the pivot bolts 41, 42. FIG. 5 also illustrates the recesses 56, 57 that may be employed with or without the radial protuberance, 47 illustrated in FIGS. 1 and 3.

Figure 4:
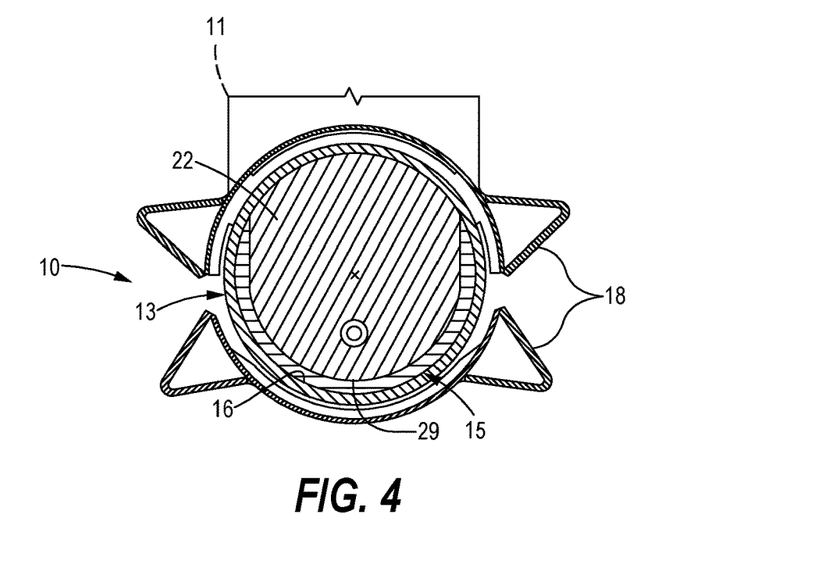
FIG. 4 is another sectional view of the gate valve assembly shown in FIG. 3 but illustrating a side view of the cartridge and paddle member as the paddle member engages the interior surface of the pipe (post-compression configuration).

The paddle member 15 may include a plurality of fabric layers 52, which may be an organic fabric material or a polymeric material. The fabric layers 52 render the paddle member 15 strong enough to withstand the forces caused by high flow and high pressure within the pipe 13. The fabric layers 52 prevent the rubber layers 51 from an undo amount stretching and prevent the rubber layers 51 from being pulled out of the slot 29 in the proximal portion 22 of the cartridge 12 that accommodates the paddle member 15 (see FIGS. 2 and 4). However, the fabric layers 52 allow lateral expansion of the paddle member 15 to expand out into the full width of the inside diameter of the pipe 13 as illustrated in FIG. 3.

While only certain embodiments have been set forth, alternatives and modifications will be apparent from the above description to those skilled in the art. Further, aspects of different embodiments can be combined or substituted by one another. These and other alternatives are considered equivalents and within the spirit and scope of this disclosure and the appended claims.

What is claimed:

1. A gate valve assembly for installation on a pipe, the pipe further having exterior and interior surfaces that are interrupted by a pipe gate opening in a top portion of the pipe, the gate valve assembly comprising:
   a nozzle comprising a distal section connected to a proximal section, the proximal section of the nozzle connected to the pipe at the pipe gate opening in the pipe,
   a paddle member comprising a lower proximal portion disposed between and connecting a pair of spaced-apart leg portions, the leg portions and lower proximal portion of the paddle member forming an outer edge that is generally U-shaped when the paddle member is in a pre-compression configuration and arcuate or rounded when the paddle member is in a post-compression configuration for engaging a portion of the interior surface of the pipe, the leg portions and lower proximal portion of the paddle member also forming an inner edge disposed opposite the outer edge of the paddle member,
   a cartridge comprising a distal portion connected to a proximal portion, the cartridge further comprising a valve stem channel extending through the distal portion of the cartridge to the proximal portion of the cartridge and terminating at a proximal opening disposed in the proximal portion of the cartridge, the proximal portion of the cartridge comprising a slot for accommodating at least the inner edge of the paddle member, the slot extending around across the proximal opening,
   in the pre-compression configuration, the inner edge of the paddle member being spaced-apart from the proximal opening, and in the post-compression configuration, the inner edge of the paddle member engaging and sealing the proximal opening while the outer edge of the paddle member engages and provides a seal against the interior surface of the pipe.

2. The gate valve assembly of claim 1 wherein the proximal opening of the cartridge and the inner edge of the paddle member provide a check-valve function by sealing the proximal opening and preventing communication between the pipe and the valve stem channel when the paddle member is in the post-compression configuration and permitting communication between the pipe and valve stem channel when the paddle member is in the pre-compression configuration.

3. The gate valve assembly of claim 1 wherein the spaced-apart leg portions of the paddle member each terminate at a distal end that is secured to the cartridge, each spaced-apart leg portion also including at least one weakened area that causes the spaced-apart legs to bias radially outward against the interior surface of the pipe when the outer edge of the paddle member at the lower proximal portion of the paddle member is pressed against a bottom of the pipe opposite the pepe gate opening.

4. The gate valve assembly of claim 3 wherein the weakened areas of the spaced-apart legs comprises recesses, and wherein the valve stem channel passes through a conduit formed in the proximal portion of the cartridge, and wherein part of the conduit disposed between the proximal opening and the distal portion of the cartridge comprises a protuberance that extends radially outwardly into the recesses of the spaced-apart legs of the paddle member and, when the outer edge of the paddle member is pressed against the bottom of the pipe, an upward bias of the spaced-apart legs of the paddle member against the protuberance causes the spaced-apart legs to bias radially outward against the of the interior surface of the pipe.

5. The gate valve assembly of claim 1 wherein the spaced-apart legs of paddle member are held in the slot disposed in the proximal portion of the cartridge by a pair of pivot bolts that hold the inner edge of spaced-apart legs against the conduit when the paddle member is both the pre-compression configuration and the post-compression configuration.

6. The gate valve assembly of claim 1 wherein the lower proximal portion of the paddle member includes a slot disposed between the inner edge and outer edge of the paddle member, the assembly further comprising a slot bolt that extends from the proximal portion of the cartridge and through the slot, so that in the post-compression configuration, compression of the outer edge of the paddle member against the bottom of the pipe causes the inner edge of the paddle member to press against the proximal opening to seal the valve stem channel and, so that in the pre-compression configuration, with the outer edge of the paddle member released from engagement with the pipe, the inner edge of the paddle member moves away from the proximal opening thereby establishing communication between the valve stem channel and the pipe.

7. The gate valve assembly of claim 1 wherein the paddle member comprises a plurality of alternating rubber and fabric layers.

8. The gate valve assembly of claim 7 wherein each fabric layer includes through holes through which rubber extends to connect one rubber layer to at least one other rubber layer and to secure each fabric layer between two rubber layers.

9. A gate valve assembly for installation on a pipe and perpendicular to a central axis of the pipe, the pipe further having exterior and interior surfaces extending circumferentially about the central axis of the pipe except at a pipe gate opening in a top portion of the pipe, the pipe gate opening having a central axis that is perpendicular to the central axis of the pipe, the gate valve assembly comprising:
   a nozzle comprising a distal section connected to a proximal section, the proximal section of the nozzle perpendicularly connected to the pipe at the pipe gate opening, the distal and proximal sections of the nozzle having a common central axis that is co-linear with the central axis of the pipe gate opening in the pipe,
   a paddle member comprising a lower proximal portion disposed between and connected to a pair of spaced-apart leg portions, the leg portions and lower proximal portion of the paddle member forming an outer edge that is generally U-shaped when the paddle member is in a pre-compression configuration and arcuate or rounded when the paddle member is in a post-compression configuration for engaging a portion of the interior surface of the pipe that extends about the central axis of the pipe and in coplanar alignment with the central axis of the pipe gate opening in the pipe and the common central axis of the nozzle, the spaced-apart leg portions and lower proximal portion of the paddle member also forming an inner edge disposed opposite the outer edge of the paddle member,
   a cartridge comprising a distal portion connected to a proximal portion, the cartridge further comprising a valve stem channel extending through the distal portion and into the proximal portion before terminating at a proximal opening disposed in the proximal portion of the cartridge, the proximal portion of the cartridge comprising a slot for accommodating at least the inner edge of the paddle member, the slot extending across the proximal opening,
   in the pre-compression configuration, the inner edge of the paddle member being spaced-apart from the proximal opening, and in the post-compression configuration, the inner edge of the paddle member engaging and sealing the proximal opening while the outer edge of the paddle member engages and provides a seal against the portion of the interior surface of the pipe that extends about the central axis of the pipe and in coplanar alignment with the central axis of the opening in the pipe and the common central axis of the nozzle.

10. The gate valve assembly of claim 9 wherein the proximal opening of the cartridge and the inner edge of the paddle member provides a check-valve function by sealing the proximal opening of conduit and preventing communication between the pipe and the valve stem channel when the paddle member is in the post-compression configuration and permitting communication between the pipe and valve stem channel when the paddle member is in the pre-compression configuration.

11. The gate valve assembly of claim 9 wherein the spaced-apart leg portions of the paddle member each terminate at a distal end that is secured to the cartridge, each spaced-apart leg portion also including at least one recess that causes the spaced-apart legs to bias radially outward against the interior surface of the pipe when the outer edge of the paddle member at the lower proximal portion of the paddle member is pressed against a bottom of the pipe opposite the pipe gate opening.

12. The gate valve assembly of claim 11 wherein the valve stem channel passes through a conduit formed in the proximal portion of the cartridge, and wherein part of the conduit disposed between the proximal opening and the distal portion of the cartridge comprises a protuberance that extends radially outwardly into the recesses of the spaced-apart legs of the paddle member and, when the outer edge of the paddle member is pressed against the bottom of the pipe, an upward bias of the spaced-apart legs of the paddle member against the protuberance causes the spaced-apart legs to bias radially outward against the of the interior surface of the pipe that extends about the central axis of the pipe and in coplanar alignment with the central axis of the opening in the pipe and the common central axis of the nozzle.

13. The gate valve assembly of claim 12 wherein the spaced-apart legs of paddle member are held in the slot disposed in the proximal portion of the cartridge by a pair of pivot bolts that hold the inner edge of spaced-apart legs against the conduit when the paddle member is both in the pre-compression configuration and in the post-compression configuration.

14. The gate valve assembly of claim 9 wherein at least part of the lower proximal portion of the paddle member includes a slot disposed between the inner edge and outer edge of the paddle member, the assembly further comprising a slot bolt that extends from the proximal portion of the cartridge and through the slot, so that in the post-compression configuration, compression of the outer edge of the paddle member against the pipe causes the inner edge of the paddle member to engage and seal the proximal opening, and so that in the pre-compression configuration, with the outer edge of the paddle member free from engagement with the pipe, the inner edge of the paddle member moves away from the proximal opening thereby establishing communication between the valve stem channel and the pipe.

15. The gate valve assembly of claim 9 wherein the paddle member comprises a plurality of alternating rubber and fabric layers.

16. The gate valve assembly of claim 15 wherein each fabric layer includes through holes through which rubber extends to connect one rubber layer to at least one other rubber layer and to secure the fabric layers between two rubber layers.

17. A gate valve for a pressurized pipe, the gate valve comprising:
   a paddle member comprising a lower proximal portion disposed between and connecting a pair of spaced-apart and leg portions, the leg portions and lower proximal portion of the paddle member forming an outer edge, the leg portions and lower proximal portion of the paddle member also forming an inner edge disposed opposite the outer edge of the paddle member,
   a cartridge comprising a distal portion connected to a proximal portion, the cartridge further comprising a valve stem channel extending through the distal portion and through a conduit extending from the distal portion into the proximal portion and terminating at a proximal opening of the proximal portion of the cartridge, the proximal portion of the cartridge comprising a slot for accommodating at least the inner edge of the paddle member,
   in a pre-compression configuration, the inner edge of the paddle member being spaced-apart from the proximal opening, and in the post-compression configuration, the inner edge of the paddle member engaging and sealing the proximal opening resulting in the inner edge of the paddle member and the proximal opening forming a check-valve that is open when the paddle member is in the pre-compression configuration and closed when the paddle member is in the post-compression configuration.

* * * * *